May 9, 1961 D. H. PRITCHARD ET AL 2,983,783

COLOR TELEVISION SYNCHRONIZING CIRCUITS

Filed July 25, 1952 2 Sheets-Sheet 1

INVENTOR.
Dalton H. Pritchard &
Alfred C. Schroeder
BY [signature]
ATTORNEY

INVENTOR.
Dalton H. Pritchard &
Alfred C. Schroeder
BY [signature]
ATTORNEY

United States Patent Office 2,983,783

Patented May 9, 1961

2,983,783

COLOR TELEVISION SYNCHRONIZING CIRCUITS

Dalton H. Pritchard, Princeton, N.J., and Alfred C. Schroeder, Huntingdon Valley, Pa., assignors to Radio Corporation of America, a corporation of Delaware Filed July 25, 1952, Ser. No. 300,854

2 Claims. (Cl. 178—5.4)

Figure 1:
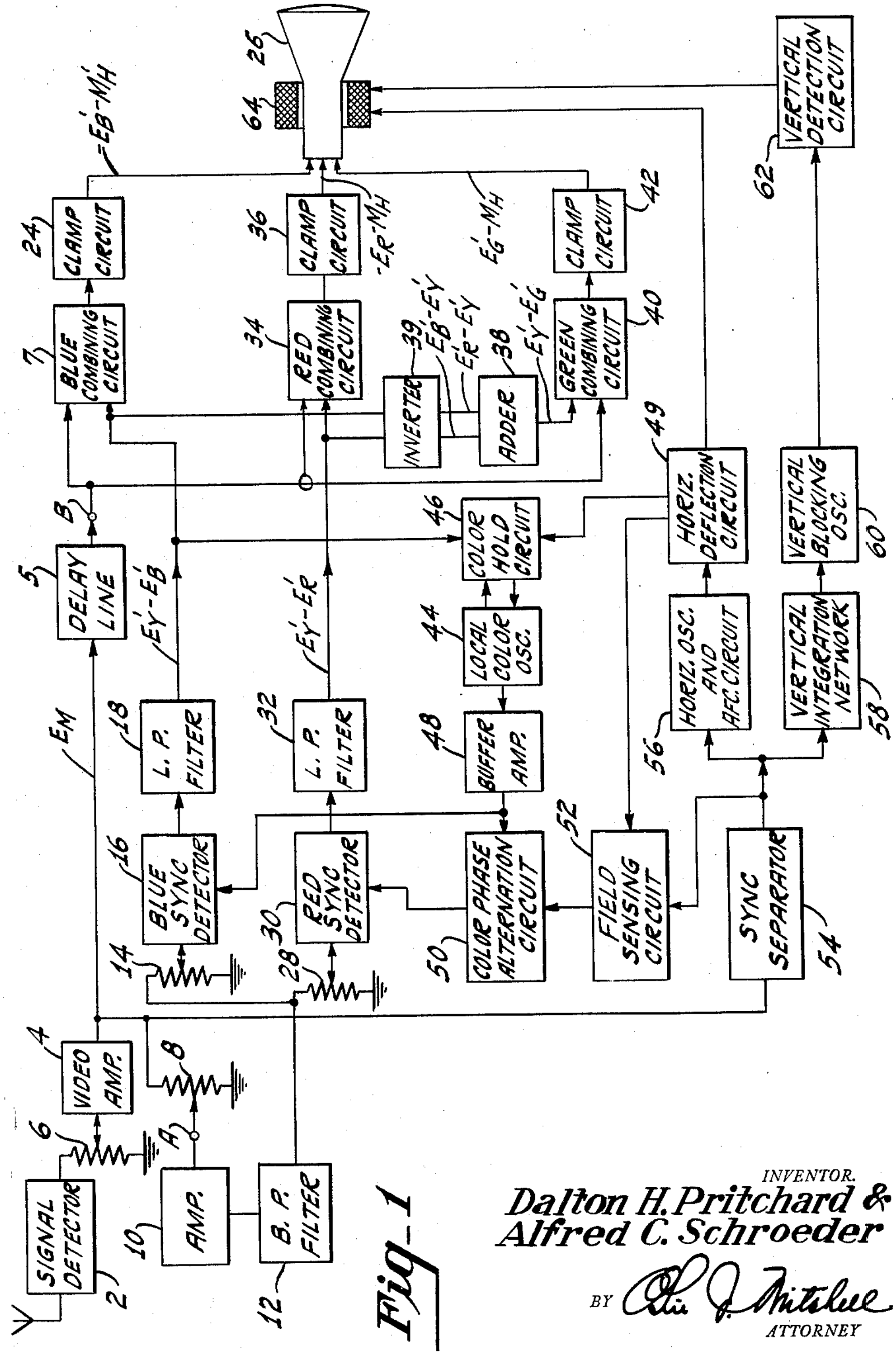

This invention relates to improvements in color television receivers and in particular to improvements in color synchronizing circuits employed therein.

In one color television system the signal representing the required video information has two video components. One component represents variations in brightness and corresponds to the signal now employed in standard black and white television systems. The other video component is a color carrier that is phase and amplitude modulated in accordance with the hue and saturation of the color represented.

One way of deriving the color carrier is as follows. The output of a color oscillator of color carrier frequency is applied to a phase splitter and each differently phased output of the phase splitter is amplitude modulated with signals representing different sets of color information. The output of the separate modulations are then combined to provide the desired color carrier. In order to save bandwidth, the frequency of the color carrier is so chosen that it and at least some of its sidebands lie within the portion of the frequency spectrum occupied by the brightness signal. For reasons that will be explained subsequently, the frequency of the color carrier is related to the line scanning frequency so that its phase changes by 180° between successive scansions of any given line of the raster.

In order to recover and separate the different sets of color information that are used to amplitude modulate the different phases of color carrier frequency provided by the phase splitter in the transmitter, it is necessary to heterodyne or multiply the color carrier with alternating current waves having corresponding phases. The apparatus for recovering the color information in this manner is generally termed a synchronous detector.

Theoretically, the alternating current waves could be provided at the receiver by applying the output of a free running local color oscillator of color carrier frequency to a phase splitter that is identical to the one employed in the transmitter. If the phase of the local color oscillator could be made the same as the phase of the color oscillator at the transmitter, then the output of the phase splitter in the receiver would be identical to the output of the phase splitter in the transmitter, and each of the differently phased outputs could be applied to a synchronous detector so as to recover the color information conveyed by the color carrier. Actually the oscillator's drift in phase and frequency is too great for such a method of operation to be practical. Therefore it has been proposed by A. V. Bedford in U.S. patent application bearing Serial No. 143,800 filed on February 11, 1950, now Pat. No. 2,728,812, granted Dec. 27, 1955, several cycles of a selected phase of the color oscillator output may be added to the normal signals employed to synchronize the scanning at the transmitter and receiver. These few cycles of energy may be used to lock the local color oscillator at the receiver into a fixed phase relationship with the color oscillator at the transmitter. Such circuits are hereinafter referred to as "color hold" circuits.

In the arrangement suggested by Bedford in the application identified above, the phase of the local color oscillator was compared with the phase of the cycles of color carrier frequency contained in the burst so as to produce a phase control signal that was applied so as to control the phase of the local color oscillator in the receiver. During the burst, the voltage appearing at the output of each synchronous detector assumes a value that depends on the phase relationship between the cycles of color carrier frequency in the burst and the alternating current voltage derived from the local color oscillator via the phase splitter. In the U.S. application bearing Serial No. 265,084 filed on January 5, 1952 in the name of Alfred C. Schroeder the voltage at the outputs of two synchronous detectors during the burst interval are compared and the resulting signal is employed to control the phase of the local color oscillator. In this way the comparison circuits and the circuit that controls the phase of the oscillator in response to the output of the phase comparison circuit are both operated at very low frequencies.

It is an object of the present invention to provide a simple color hold circuit.

This objective may be attained by using the voltage produced in response to the burst by only one synchronous detector to control the phase of the local color oscillator in the receiver. For example, if the alternating current wave of the burst is 90° out of phase with the waves supplied to a particular synchronous detector from the local color oscillator, the output of the synchronous detector may be zero or some other predetermined value. If, however, the phase of the local color oscillator in the receiver should advance with respect to the burst the voltage appearing at the output of the synchronous detector will change in a direction depending on the particular form of synchronous detector employed. If on the other hand the phase of the oscillator should be retarded with respect to the burst the output of the synchronous detector would change in the opposite direction. The oscillator and its associated phase control circuit is adjusted to be 90° out of phase with the burst when the output of the synchronous detector is zero or the predetermined value. This departure of the phase of the voltage appearing at the output of the synchronous detector from zero or from the predetermined value attained when the burst is 90° out of phase with the local color oscillator may be applied to shift the phase of the oscillator in the proper direction.

Figure 2:
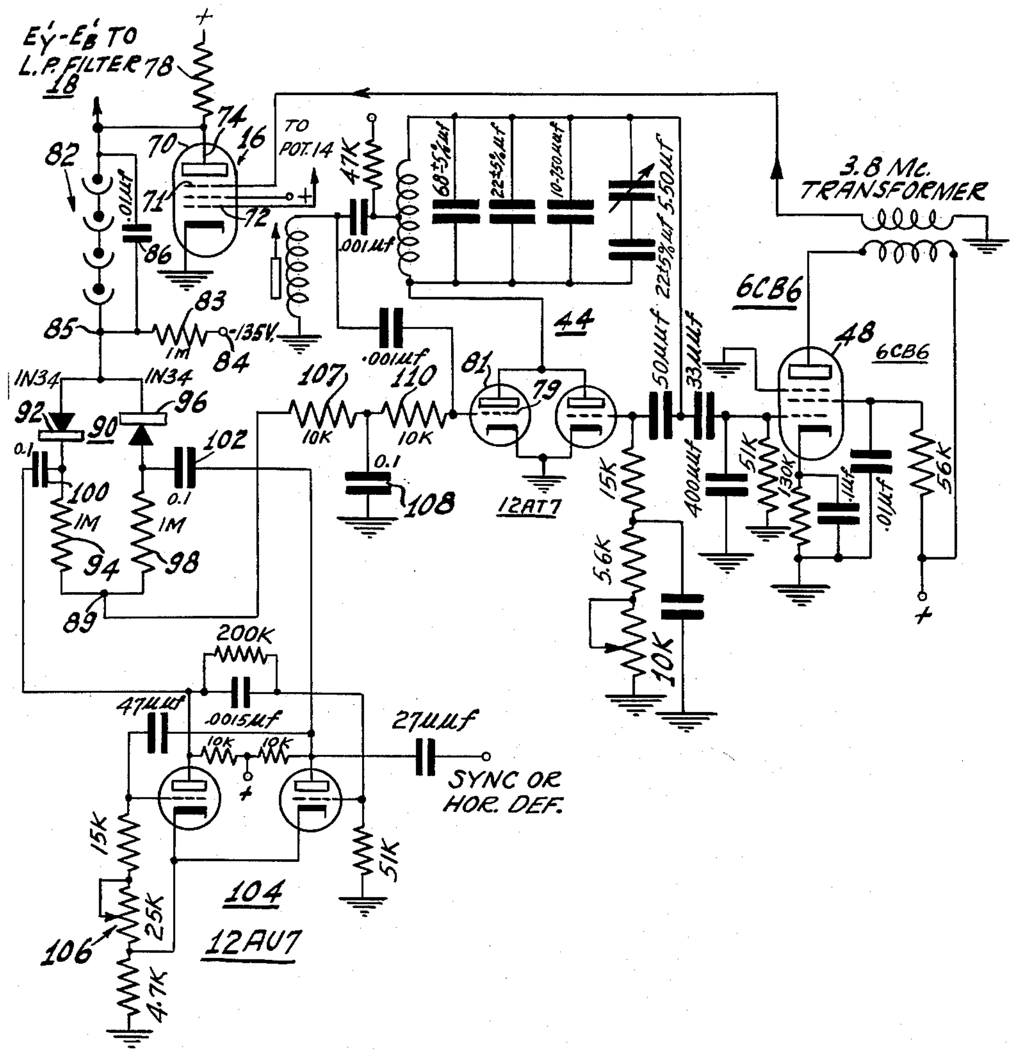

The manner in which this invention operates to achieve the objective noted above will be more clearly understood after the following detailed description of the drawings in which:

Figure 1 is a block diagram of one form of color receiver in which the present invention can be used; and Figure 2 is a schematic diagram of one form of circuit that embodies the principles of this invention.

The present invention may be used advantageously in any color television system of the type set forth above, i.e., one in which the color carrier is modulated with sets of color information that contain components of each of the selected component colors. Many variations in the brightness signal and the sets of color information that are applied to the modulators at the transmitter so as to form the color carrier may be employed, but the invention will be described as embodied in a color television system described in an article entitled, "Principles of NTSC Compatible Color Television" appearing at page 88 et seq. of "Electronics" for February 1952.

The transmitted signal $E_m$ may be defined by the following expression:

(*a*)

$$E_m = E_y' + \frac{1}{1.14}\left(\frac{1}{1.78}(E_b' - E_y')\ \mathrm{Sin}\ \omega t + (E_r' - E_y')\ \mathrm{Sin}\ (\omega t \pm 90°)\right)$$

where $E_y'$ is the gamma corrected brightness signal that is comprised of gamma corrected color signals as indicated by the expression:

(*b*)

$$E_y' = 0.59E_g' + 0.30E_r' + 0.11E_b'$$

$E_g'$, $E_r'$ and $E_b'$ represent the green, red and blue gamma corrected color signals respectively and $\omega$ is the frequency of the color carrier expressed in radians. The color carrier may be derived during one field by modulating a zero degree phase of the color carrier frequency with a blue color difference signal $E_b'-E_y'$ reduced by a factor of 2.03 and a 90° phase of a red color difference signal $E_r'-E_y'$ that is reduced by a factor of 1.14. During the next field the color carrier may be derived by modulating a zero degree phase of the color carrier frequency with the same portion of the blue color difference signal $E_b'-E_y'$ as before but by modulating a 270° phase of the color carrier frequency with the same portion of the red color difference signal $E_r'-E_y'$. The upper frequency of the color difference signals may be limited to some low value such as 1 megacycle so that the sidebands produced by the modulator in response to the color difference signals lie within 1 megacycle on each side of the color carrier frequency $\omega$. As $\omega$ is generally placed rather high in the video spectrum of the brightness signal, the color information represented by the sidebands lies in the upper portion of the video spectrum. During each field the outputs of the modulators are combined to form the color carrier and it is added to the brightness signal $E_y'$. The brightness signal $E_y'$ is itself derived by adding the different color signals in the proportions indicated by the expression (*b*). The portion of the color difference signals applied to the modulators is as indicated by the coefficients of the expression (*a*).

One form of receiver that may be used to reproduce images in color from the signal $E_m$ and which embodies the present invention is illustrated in the block diagram of Figure 1. The signal $E_m$ is recovered by any suitable signal detector 2, and a desired portion of it is supplied to a video amplifier 4, via a contrast control 6 that is shown as a potentiometer. The output of the video amplifier is applied via a delay line 5 to a blue combining circuit 7. A desired portion of the output of the video amplifier is selected by a chroma control 8, here shown as a potentiometer, and is coupled via an amplifier 10 to a band pass filter 12 that is designed to pass frequencies in the upper region of the video spectrum occupied by the sidebands containing the color information. A portion of the output of the band pass filter 12 is coupled by a potentiometer 14 to a blue synchronous detector 16 wherein it is heterodyned with a zero degree phase of the color carrier frequency. It is to be understood that this zero degree phase is the same phase as the color carrier has at the synchronous detector when it is zero degrees at the transmitter. The manner in which this phase of the color carrier frequency is derived will be described below. If the transmitted and received signal $E_m$ is as represented by the expression (*a*) and if the overall relative gain of the chroma control 8, the amplifier 10, the band pass filter 12, the potentiometer 14, the synchronous detector 16 and the low pass filter 18 with respect to the gain afforded by the signal $E_m$ by the delay line 5 is 2.03, the negative blue color difference signal $E_y'-E_g'$ is recovered. The heterodyning action of the synchronous detector produces upper and lower sidebands, and the lower sidebands containing the color difference signals in their original frequency is selected by a low pass filter 18, if the lowest frequency passed by the band pass filter 12 is not lower than the highest frequency passed by the low pass filter 18, no frequencies of the signal $E_m$ will pass directly through both of them. The negative blue color difference signal $E_y'-E_b'$ that appears at the output of the low pass filter 18 is then applied to the blue combining circuit 7. The signal $E_m$ appearing at the output of the video amplifier 4 is delayed by a delay line 22 by the same amount that the negative blue color difference signal $E_y'-E_b'$ is delayed in passing from the output of the video amplifier 4 to the input of the combining circuit 7. Thus the signal $E_m$ and the negative blue color difference signal $E_y'-E_b'$ arrive at the input of the combining circuit 7 in proper time relationship. The gain of the blue synchronous detector 16 is generally made greater than the maximum required so that the chroma control 8 can be adjusted to increase or decrease the relative amplitude of the color difference signal with respect to the signal $E_m$. In this way the amplitude of the brightness component $E_y'$ in the signal $E_m$ can be made equal to the amplitude of the corresponding brightness component $E_y'$ in the negative blue color difference signal. With the polarities indicated the subtraction of the signal $E_m$ from the negative color difference signal $E_y'-E_b'$ yields:

(*c*) $E_y'-E_b'-E_y'-$(A.C. components of expression "*a*")

The A.C. components may be termed mixed highs $M_H$ as they are the high frequency components of all colors combined. The low frequency brightness components $E_y'$ and $-E_y'$ cancel out. The high frequency components $M_H$ of $E_y'$ pass through the combiner 7. The signals at the output of the combiner 7, including the high frequency portion $-M_H$ of the brightness signal $-E_y'$ and the low frequency color signal $-E_b'$ are clamped in normal manner by a D.C. restoration or clamp circuit 24 before being applied to an electrode of a color kinescope 26 that controls the intensity of the blue light emitted by the kinescope.

In order to recover the red signal $-E_r'$ the following operation is performed. The output of the band pass filter 12 is coupled via a potentiometer 28 to a red synchronous detector 30 wherein it is heterodyned during successive fields with 90° and 270° phases of the color carrier frequency that are derived in a manner to be described. Two sidebands are produced by the modulation process, and the lower one containing the original frequencies of the negative red color difference signal $E_y'-E_r'$ that was applied to one of the modulators at the transmitter is selected by a low pass filter 32 and is applied to a red combining circuit 34 where it is combined with the total received signal $E_m$ (see expression "*a*") in such manner as to cancel out the low frequency portion of the brightness signal $E_y'$ and produce the low frequency red color signal $E_r'$. This signal, the high frequency portion of $E_y'$ and the color carrier and its sidebands are all clamped in a normal manner by a clamp circuit 36 before being applied to an electrode in the kinescope 26 that controls the intensity of the red light emitted.

Positive color difference signals $E_b'-E_y'$ and $E_r'-E_y'$ are reversed in separate sections of an inverter 39 and 51% of the former and 19% of the latter are combined in an adder 38 so as to derive a negative green color difference signal $E_y'-E_g'$. Inasmuch as only fractional amounts of the color difference signals are required, the adder 38 does not have to furnish any gain and therefore peaking circuits that introduce delay are not required. The negative green color difference signals $E_y'-E_g'$ is then applied to a green combining circuit 40 where it is combined with the signal $E_m$ so as to produce the green color signal $-E_g$. This signal is clamped by a circuit 42 and applied to an electrode of the kinescope 26 that controls the amount of green light emitted.

In the receiver just described the negative color signals $-E_b'$, $-E_r'$ and $-E_g'$ emerged from the various combining circuits. If positive color signals are required the amplifier 10 of Figure 1 could be a cathode follower so that the polarity of the color signals would not be reversed and the outputs of the synchronous detector would be the original color difference signals $E_b'-E_y'$ and $E_r'-E_y'$. In order to cancel the $-E_y'$ term in the combining circuits any known means for inverting the signal $E_m$ could be employed.

A color phase sensing circuit 52 provides in response to the flyback pulses occurring in the horizontal deflection circuit 49 and the output of a standard sync separator circuit 54 a control signal that serves to change the phase appearing at the output of the color phase alternation circuit at field rate.

The scanning of the beams in the kinescope 26 is controlled in any known manner by a horizontal oscillator and AFC circuit 56, the horizontal deflection circuit 49, a vertical integrating network 58, a vertical blocking oscillator 60, a vertical deflection circuit 62 and a yoke 64.

Figure 2 is a schematic diagram of one circuit capable of controlling the phase of the local color oscillator 44 with the voltage supplied by the blue synchronous detector 16 during the burst interval. Those components of Figure 2 that are detailed circuits of the blocks in Figure 1 are designated by the same numerals as the blocks. The blue synchronous detector may be constructed in many ways but as shown is a pentode 70 having a grid 71 coupled to the output of the buffer amplifier 48 and a grid 72 coupled to the movable arm of the potentiometer 14. During the scansion of a line, the voltage at the plate 74 of the pentode varies in accordance with the blue color difference signal. During the burst interval that occurs during the blanking intervals between line scansions the value of the plate voltage depends on the phase relationship between the waves of carrier frequency derived from the local color oscillator 44 and applied to the grid 71 via the buffer amplifier 48 and the waves of color carrier frequency contained in the burst. If these two waves are 90° out of phase with each other then the voltage at the plate 74 is substantially the same value that would exist if the voltage waves were not present. If the phase of the local color oscillator 44 advances with respect to burst, so that the two sets of waves of color carrier frequency are separated by more than 90°, the voltage at the plate 74 goes less positive. If on the other hand the phase of the oscillator 44 is such that it is separated from the burst by less than 90° the voltage at the plate 74 goes more positive.

These variations in the plate voltage may be D.C. coupled in the following manner to the grid 79 of a reactance tube 81 that controls the phase of the oscillator 44. A series of voltage regulating tubes 82 is connected in series with a resistor 83 between the plate 74 and a source of negative potential 84 and operates to establish the D.C. potential of the junction 85 that lies between the series of voltage regulating tubes 82 and the resistor 83 at a value that is between the D.C. potential of the plate 74 and the D.C. potential of the source 84. The exact value depends on the voltage drop occurring in the tubes 82. A bypass condenser 86 is connected in parallel with the series of voltage regulating tubes 82 so as to aid in coupling the high frequency variation appearing at the plate 74 to the junction 85. As is well known to those skilled in the art the circuit just described lowers the D.C. potential but does not lower the A.C. potential.

A switching circuit 90, that operates in a manner similar to a keyed clamp circuit, is connected between the junction 85 and a junction 89 and operates to establish the two junctions at the same potential during the burst interval. At other times the switching circuit 90 is open so that voltage variations, for example the blue color difference signal appearing at the plate 74 and the junction 85 during line scansion, do not appear at the junction 89. In the particular arrangement, the left hand branch of the switching circuit 90 is comprised of a diode 92 and a resistor 94, and the right hand branch is comprised of a diode 96 and a resistor 98. The diode 92 is polarized so that it can conduct electrons from the junction 89 to the junction 85, and the diode 96 is oppositely polarized with respect to these junctions so that it can conduct electrons from the junction 85 to the junction 89.

The switching circuit 90 is closed during the burst interval by coupling a negative keying pulse to the cathode of the diode 92 via a condenser 100 and a positive keying pulse to the plate of the diode 96 via a condenser 102. The keying pulses are provided by an unistable multivibrator 104 that is triggered to its unstable condition in response to either horizontal sync pulses or to flyback pulses normally available in the horizontal deflection circuit 49. A width control 106 is adjusted so that the keying pulses are present during the burst interval following the horizontal sync pulses. Multivibrators of the type are well known in the art and further explanation of their operation is therefore not considered necessary. The multivibrator 104 is shown in detail but it will be understood that any other multivibrator of the same type could be used. For that matter any circuit that would produce positive and negative pulses during the burst interval could be used instead of the multivibrator. During the keying pulses, the right hand plate of the condenser 100 is charged positively and the left hand plate of the right hand condenser 102 is charged negatively. The time constant of the discharge circuits of these condensers is such that they do not discharge appreciably for at least several lines, and the amplitude of the keying pulses is greater than the quiescent voltage at the plate 74 so that both diodes are cut off between pulses. The operation of the circuit is well known to those skilled in the art, but will now be explained for the sake of completeness. Assume that the junction 85 is at −10 volts during any given burst, that the keying pulse applied to the cathode of the diode 92 is −100 volts and that the keying pulse applied to the plate of the diode 96 is +100 volts. The left hand condenser will then charge up so that its right hand plate is −110 volts, and the left hand plate of the right hand condenser 102 will be charged to +90 volts. The equal resistors 94 and 98 are connected in series between the condensers so that they act as a potentiometer with arms of equal resistance. Hence the voltage of the junction 89 will be half way between −110 and +90 volts or at −10 volts which is the same voltage as junction 85.

The voltage appearing at the junction 85 is connected to a flywheel or integrating circuit comprised of a resistor 107 and a condenser 108, and the voltage built up across the condenser 108 is applied via a resistor 110 to the grid 79 of the reactance tube 81. The time constant of the flywheel circuit must be such that any change in voltage applied to it as a result of a phase error in the oscillator must charge the condenser 108 at a rate such that the phase of the oscillator is shifted by the reactance tube more rapidly than the oscillator can drift in phase. Generally the phase shifts in the oscillator are very slow so that the flywheel circuit can have a time constant in the order of a field scanning interval. Thus any noise occurring during the burst interval is averaged out over a large number of lines and have very little effect. The gain of the loop including the blue synchronous detector, the flywheel circuit, the reactance tube, the oscillator and the buffer amplifier should be large so that a xery small phase error in the oscillator produces enough correction voltage at the plate 74 of the blue synchronous detector to change the phase of the oscillator by the same small amount. As the gain is increased the correction voltage applied to the flywheel circuit increases and the rate of change of voltage across the condenser 108 increases more rapidly. Thus as the gain increases, the R.C. time constant of the flywheel circuit should be increased so as to prevent the rate of change of voltage across the condenser 108 from over-correcting the phase of the oscillator and set up oscillations in the phase correction loop itself.

It will be apparent to one skilled in the art that many variations can be made in the circuits of Figure 2 in order to produce similar results. For example, the string of voltage regulating tubes 82 may be replaced by a battery. They can be eliminated by running the synchronous detector 16 at negative operating potential or by running the reactance tube-oscillator combination at more positive operating potential. The coupling between the plate 74 of the synchronous detector 16 to the grid of the reactance tube 81 need only be a D.C. coupling and these are merely well known ways of accomplishing this type of coupling. It will also be apparent that other types of keyed switching circuits could be substituted for the switching circuit 90.

What is claimed is:

1. In a color television receiver adapted to receive a composite color television signal including a phase and amplitude modulated color subcarrier component and color synchronizing bursts of color subcarrier frequency at a reference phase, color difference signal information relating to a particular component color being recoverable from said phase and amplitude modulated color subcarrier by synchronous detection of said modulated color subcarrier using reference oscillations in a phase quadrature relationship to said reference phase, said color television receiver including a source of reference oscillations nominally of color subcarrier frequency, a plurality of color demodulators each being responsive to the modulated color subcarrier component of said composite color television signal, one of said color demodulators being provided to recover color difference information relating to said particular component color, and means for applying reference oscillations from said source to said one color demodulator nominally in said phase quadrature relationship to said reference phase, said one color demodulator comprising an amplifying device having input circuitry to which said modulated color subcarrier and said reference oscillations are applied and an output electrode supplied with an operating potential and at which the product of synchronous detection of said modulated color subcarrier appear; color synchronizing apparatus comprising the combination of a voltage dividing network coupled between said output electrode and a point of reference potential, said voltage dividing network including at least one constant voltage device interposed between an intermediate point on said voltage divider network and said output electrode, an integrating circuit, means for periodically providing a conducting current path between said intermediate point on said voltage divider network and said integrating circuit, said periodic current path means comprising a pair of parallel connected, oppositely poled diodes, the parallel connected diodes linking said intermediate point to said integrating circuit, means for biasing both of said diodes to be normally non-conductive, a source of keying pulses occurring in substantial time coincidence with the occurrence of said color synchronizing bursts, and means for utilizing said keying pulses to periodically render said diodes conducting during the appearance at said output electrode of the products of synchronous detection of said burst by said reference oscillations, said integrating circuit developing a control voltage representative of said phase relationship between said color synchronizing bursts and said reference oscillations, and frequency control means coupled to said source of reference oscillations and to said integrating circuit for controlling the frequency and phase of said reference oscillations in accordance with said control voltage.

2. Apparatus in accordance with claim 1 wherein the operating potential supplied to said output electrode is of positive polarity, wherein the point of reference potential to which said voltage dividing network is connected is at a potential of negative polarity, and wherein said constant voltage device serves to maintain said intermediate point at substantially zero potential when the phase relationship between said color synchronizing bursts and the reference oscillations applied to said one color demodulator is the desired relationship of said phase quadrature.

References Cited in the file of this patent

UNITED STATES PATENTS

| | | |
|---|---|---|
| 2,378,746 | Beers | June 19, 1945 |
| 2,399,421 | Artzt | Apr. 20, 1946 |
| 2,754,356 | Espenlaub | July 10, 1956 |
| 2,766,321 | Parker | Oct. 9, 1956 |

OTHER REFERENCES

A Two Color Direct View Receiver, RCA, November 1949.